United States Patent
Lehner et al.

(10) Patent No.: US 6,837,100 B1
(45) Date of Patent: Jan. 4, 2005

(54) DETECTION OF COMBUSTION MISFIRING

(75) Inventors: Michael Lehner, Muehlacker (DE); Andrea Lohmann, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 63 days.

(21) Appl. No.: 10/088,867

(22) PCT Filed: Sep. 2, 2000

(86) PCT No.: PCT/DE00/03024
§ 371 (c)(1),
(2), (4) Date: Mar. 22, 2002

(87) PCT Pub. No.: WO01/23728
PCT Pub. Date: Apr. 5, 2001

(30) Foreign Application Priority Data

Sep. 30, 1999 (DE) .......................... 199 46 873

(51) Int. Cl.$^7$ ............ G01L 3/26; G01L 5/13; G01M 15/00
(52) U.S. Cl. ............................................. 73/117.3
(58) Field of Search .................. 73/116, 117.3; 701/110; 123/673, 406.24, 406.6

(56) References Cited

U.S. PATENT DOCUMENTS

| | | | | |
|---|---|---|---|---|
| 5,747,679 A | * | 5/1998 | Dietz et al. .................. 73/116 |
| 5,822,710 A | * | 10/1998 | Mezger et al. ............... 701/110 |
| 5,861,553 A | * | 1/1999 | Janetzke et al. ........... 73/117.3 |
| 5,892,897 A | * | 4/1999 | Carlson et al. ............. 701/110 |
| 5,955,663 A | * | 9/1999 | Ries-Muller et al. ...... 73/117.3 |
| 6,209,519 B1 | * | 4/2001 | Melchior et al. ....... 123/406.24 |
| 6,694,960 B2 | * | 2/2004 | Hess et al. .................. 123/673 |

FOREIGN PATENT DOCUMENTS

DE 195 40 675 4/1997

* cited by examiner

Primary Examiner—Edward Lefkowitz
Assistant Examiner—Octavia Davis
(74) Attorney, Agent, or Firm—Walter Ottesen

(57) ABSTRACT

A method for detecting combustion misfires in internal combustion engines on the basis of an evaluation of the segment times is introduced wherein a shaft of the engine passes over predetermined angular segments. The method is characterized by variable segment lengths and/or segment positions relative to a reference point of the movement of the pistons of the engine. The position of the angle segments and/or the segment length, that is, the angular expansion of the angular segments, is dependent upon operating parameters of the engine.

4 Claims, 4 Drawing Sheets

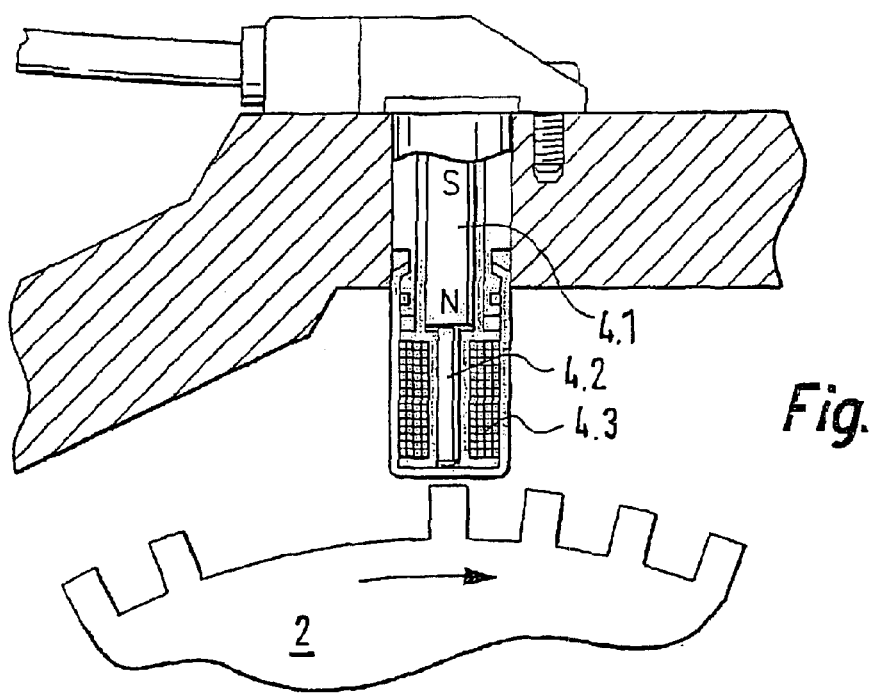
Fig. 2a
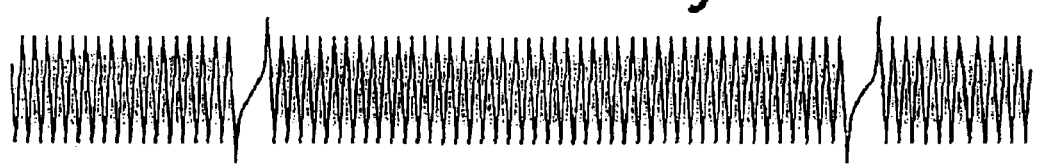
Fig. 2b
Fig. 2c
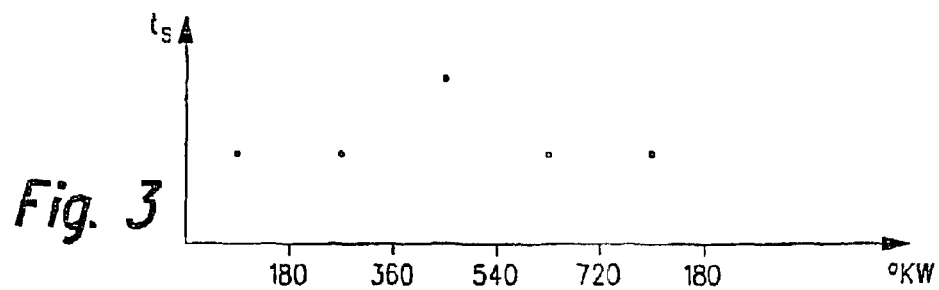
Fig. 3

DETECTION OF COMBUSTION MISFIRING

This application is a 371 of PCT/DE00/03024 Sep. 2, 2000.

FIELD OF THE INVENTION

The invention relates to a method for detecting combustion misfires in internal combustion engines as they are used for the drive of motor vehicles.

BACKGROUND OF THE INVENTION

Combustion misfires lead to an increase of the toxic substances, which are emitted during the operation of the internal combustion engine, and can lead to damage of a catalytic converter in the exhaust-gas system of the engine. To satisfy statutory requirements for on-board monitoring of exhaust-gas relevant functions, a detection of combustion misfires is necessary in the entire rpm and load ranges. In this connection, it is known that characteristic changes of the rpm characteristic trace or curve of the internal combustion engine occur during operation with combustion misfires compared to the normal operation without misfires. One can distinguish between normal operation without misfires and operation with misfires from the comparison of these rpm traces.

A method, which operates on this basis, is already known from U.S. Pat. No. 5,955,663.

In this known method, a crankshaft angle region, which is identified as a segment, is assigned to a specific region of the piston movement of each cylinder. The segments are realized, for example, by markings on a transducer wheel coupled to the crankshaft. The segment time is the time in which the crankshaft passes through this angular region and is dependent, inter alia, on the energy converted in the combustion stroke. Misfires lead to an increase of the ignition-synchronously detected segment times. According to the known method, an index for the rough running of the engine is computed from the differences of segment times. Additionally, slow dynamic operations, for example, the increase of the engine rpm during a vehicle acceleration, are compensated by computation. A rough-running value, which is computed in this way for each ignition, is likewise compared ignition-synchronously to a predetermined threshold value. This threshold value is dependent, if required, on operating parameters such as load and rpm and exceeding this threshold value is evaluated as a misfire.

The reliability of the method is decisively dependent upon the accuracy with which the rpm differences of the crankshaft, which are characteristic for misfires, can be determined from the segment times.

SUMMARY OF THE INVENTION

In view of this background, it is an object of the invention to further increase this accuracy.

A significant element of the solution comprises that the position of the angle segments relative to a reference point of the movement of the pistons of the engine and/or the angular expansion of the angle segments is dependent upon operating parameters of the engine.

The invention is based on the realization that the determination of a single segment position and segment length for the entire engine operating range, as known up to now, is not optimal. According to the invention, the position and/or the length of the segments is dependent upon the operating parameters of the engine. Suitable operating parameters on which the start and length of the segments can depend are, for example, the torque, the load, or the cylinder charge and the rpm of the engine.

The disturbance distance, that is, the distance between the rough-running signal, which is disturbed by misfires, to the undisturbed rough-running signal is increased by the more ideal position and length of the segment times.

In this way, the recognition quality improves. The increase of the sensitivity associated therewith permits also the detection of smaller differences in the combustions, for example, from unwantedly different injection quantities which can be caused by the formation of combustion residues on the injection valves.

From the above, interventions into the injection for the compensation of different injection quantities are realized on the basis of the rough running.

BRIEF DESCRIPTION OF THE DRAWING

The embodiments of the invention are described in the following with reference to the drawings.

FIG. 2 shows details of the rpm sensors and the time-dependent trace of the signal of the rpm sensor 4 on the crankshaft of the engine plus the phase signal of the sensor 6 on the camshaft.

FIG. 3 shows the known principle of forming segment times as the basis of an index for the rough running on the basis of rpm measurements.

DESCRIPTION OF THE PREFERRED EMBODIMENTS OF THE INVENTION

Figure 1:
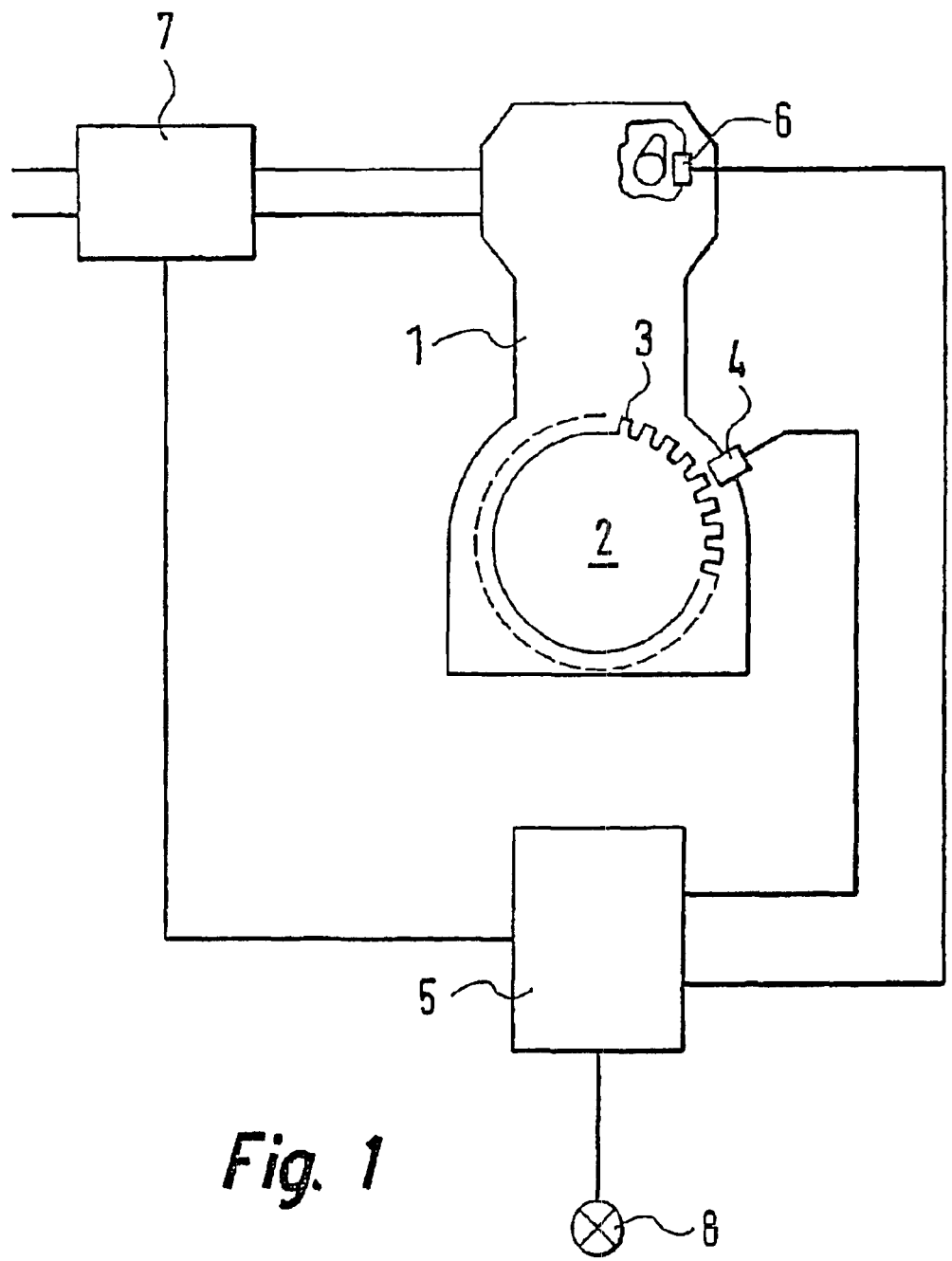
FIG. 1 shows the technical background of the invention.

FIG. 1 shows an internal combustion engine 1 having an angle transducer wheel 2 which carries markings 3 as well as an angle sensor 4, a control apparatus 5, a phase sensor 6, means 7 for detecting the air quantity which flows into the engine and a fault lamp 8.

FIG. 2a shows details of the rpm transducer system comprising angle transducer wheel 2 and angle sensor 4. The angle transducer wheel is, for example, mounted on the crankshaft as a ferromagnetic transducer wheel having space for 60 teeth. Two teeth (tooth gap) are omitted. The inductive rpm sensor scans this tooth sequence of 58 teeth. The rpm sensor comprises a permanent magnet 4.1 and a soft iron core 4.2 having a copper winding. The magnetic flux changes in the sensor when the transducer wheel teeth pass the sensor. An alternating voltage is induced as shown in FIG. 2b.

The control apparatus detects the tooth gap from the enlarged spacing of the signal flanks. The tooth gap is assigned to a defined crankshaft position which has a fixed reference to top dead center TDC of the first cylinder. The signal of the phase sensor 6 is shown in FIG. 2c and permits one to distinguish between charge change TDC and ignition TDC. For this purpose, the sensor 6 supplies information in the form of a marking in the signal as to the angular position of the crankshaft relative to the camshaft. Since the crankshaft rotates at twice the camshaft frequency in a four-stroke engine, the information is sufficient as to whether the actual camshaft position is assigned to the first or to the second crankshaft rotation.

If the marking of the signal of the phase sensor is coincident with the gap in the signal of the rpm sensor, then the control apparatus detects the ignition TDC of the first cylinder. With each successive positive or negative flank, the control apparatus counts the crankshaft position, for example, another 6° farther.

The control apparatus can detect the ignition TDC of the remaining cylinders from the total number of the teeth and the cylinder number. With four cylinders and a 60-2 transducer wheel, the ignition TDCs follow one another at a spacing of 28 or 30 teeth. For forming segment times, fifteen teeth ahead of ignition TDC, a time measurement for an angle segment is started which extends, for example, over 30 teeth. The selection of the start and length makes possible any desired lengths and positions of the segment between which a switchover can be made in dependence upon operating parameters.

The time durations ts in which the crankshaft passes over the segments so defined are further processed in the control apparatus 5 to an index Lut for the rough running of the engine. The control apparatus 5 is realized as a computer.

In FIG. 3, the times ts are plotted at which the angular regions are passed through because of the rotational movement of the crankshaft. Here, a misfire in a cylinder is assumed. The lack of torque associated with the misfire leads to an increase of the corresponding time span ts. The time spans ts thereby define already an index Lut for the rough running which is, in principle, suitable for detecting misfires.

Typically, one or two segment times per ignition are formed. In the formation of one segment time per ignition and the utilization of all markings of the transducer wheel, a segment length of 720° divided by the number of cylinders results. This leads to a segment of 180° length in a four-cylinder engine and this segment can, for example, be arranged symmetrically with respect to the ignition TDC. Up to now, fixed lengths and arrangements were used which, for example, were optimized for the detection-critical regions of low load and high rpm. At low rpms, for example, a different segment position of 126° crankshaft angle ahead of TDC up to 54° crankshaft angle after TDC would be more suitable.

An overlapping of sequential segments is likewise possible, for example, with a segment length >180° KW in a four-cylinder engine.

Figure 4A:
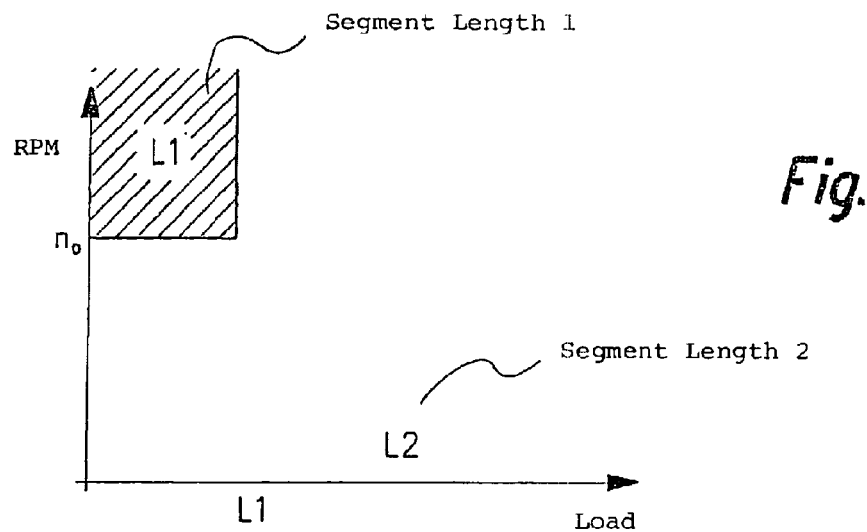
FIG. 4 shows a possible assignment of different segment lengths and segment positions to different operating ranges of the engine.
Figure 4B:
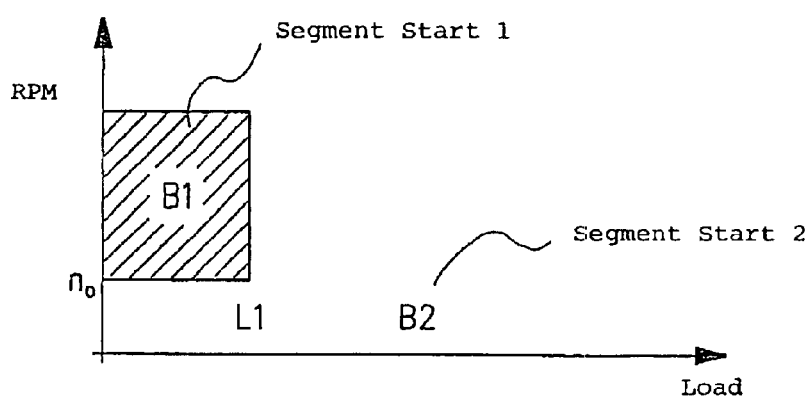

According to the invention, a switchover between several segment lengths and segment positions is dependent upon operating points. For example, at high rpms, the segment time for a four-cylinder engine is formed from 180° KW ahead of TDC up to 72° KW after TDC (segment start 1 in FIG. 4b) and, at low rpms, from 126° KW ahead of TDC to 54° KW after TDC (segment start 2 in FIG. 4b).

One can also imagine, however, a switchover across three or more regions.

Likewise, the length of the segments can be varied in dependence upon operating points so that, for example, at high rpms, segments of 180° KW (segment length 1 in FIG. 4a) and, at low rpms, segments of 162° KW length (segment length 2 in FIG. 4a) can be formed.

The switchover between different positions and between different lengths can also be combined.

For a switchover, a hysteresis can be provided in lieu of fixed limits.

Figure 4C:
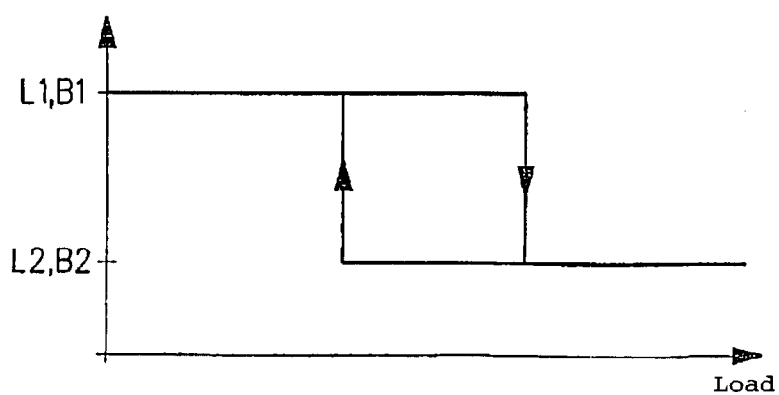

This is shown as an example in FIG. 4c. There, for a transition from low load to high load, the region switchover from region L1 and/or B1 to region L2 and/or B2 is undertaken at another load value than for the transition from the opposite direction.

Figure 5:
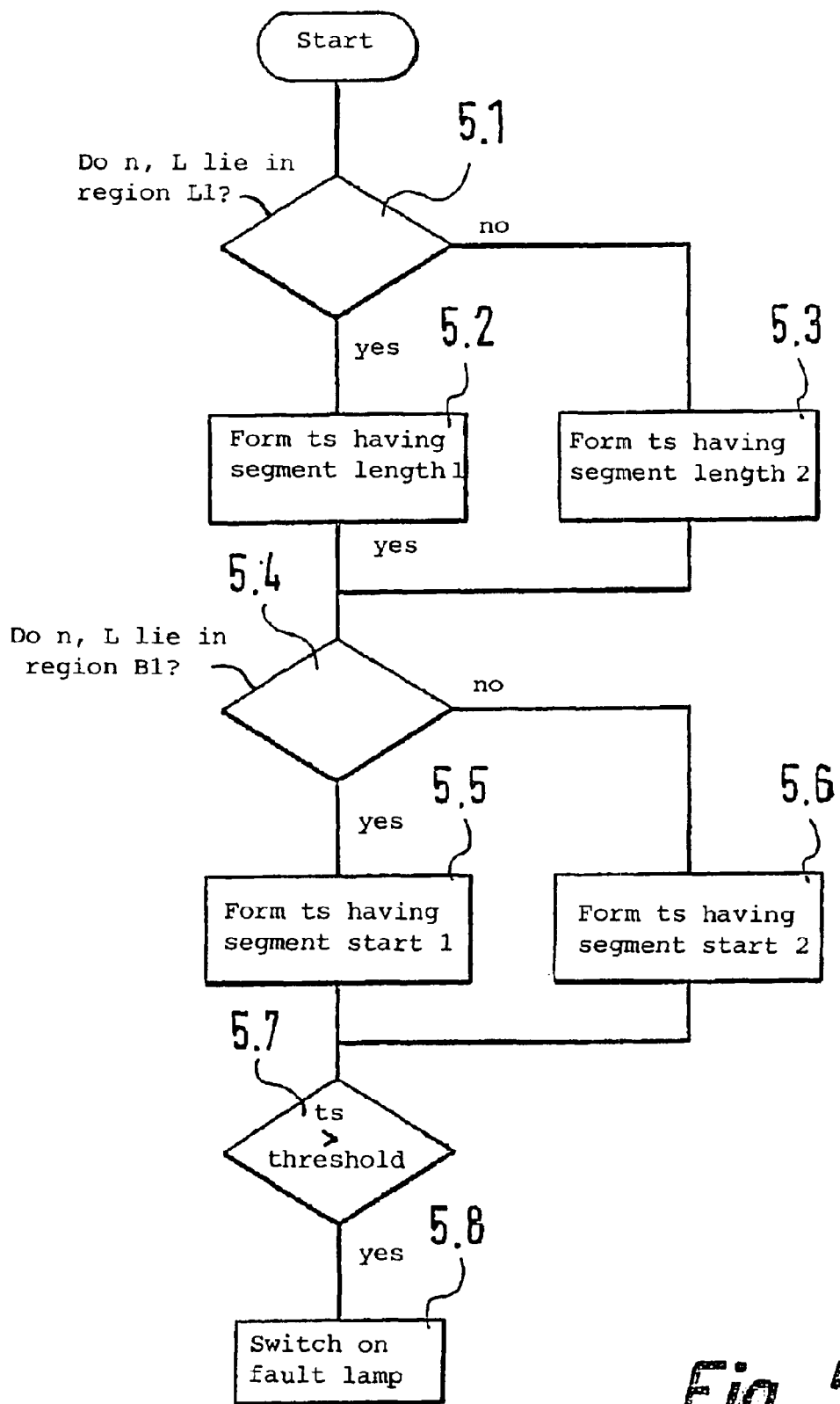
FIG. 5 discloses a flow diagram as an embodiment of the method according to the invention.

FIG. 5 shows a flowchart as an embodiment of the method of the invention which is cyclically called up (step "start") by a higher ranking engine control program. In step 5.1, a check is made as to whether the rpm n and the load L lie in a region L1. If this is answered in the affirmative then, in step 5.2, the segment time formation with the segment length 1 (see FIG. 4a) follows. Otherwise, in step 5.3, the segment time formation takes place with the segment length 2.

Thereafter, the selection of the segment start follows in steps 5.4 to 5.6. With the segment times, which are determined on the basis of the selected segment lengths and segment positions, a detection of combustion misfires takes place. In the embodiment shown, step 5.7 serves for this purpose. If the segment times exceed a predetermined threshold value, then, in step 5.8, the fault lamp is switched on. Before switching on the fault lamp an assurance of the fault announcement can be provided by evaluating the frequency of occurrence of the threshold value being exceeded (misfires) in relationship to the number of regular combustions or to the number of work strokes (combustions plus misfires).

What is claimed is:

1. A method for detecting combustion misfires in an internal combustion engine, the method comprising the steps of:

considering the position of angle segments relative to a reference point (TDC) of the movement of the piston of the engine wherein said position is dependent upon at least one operating parameter of the engine and wherein the one parameter(s) is the engine load and/or the engine rpm;

evaluating segment times in which a shaft of the engine passes through said angle segments; and, detecting said misfires when said segment times exceed a predetermined threshold value.

2. A method for detecting combustion misfires in an internal combustion engine, the method comprising the steps of:

considering the position of angle segments relative to a reference point (TDC) of the movement of the piston of the engine wherein said position is dependent upon at least one operating parameter of the engine and wherein the one parameter(s) is the engine load and/or the engine rpm;

considering an angle expansion of the angle segments;

causing the angle expansion of the angle segments to be dependent upon said at least an operating parameter of the engine;

evaluating segment times in which a shaft of the engine passes through said angle segments; and, detecting said misfires when said segment times exceed a predetermined threshold value.

3. A method for detecting combustion misfires in an internal combustion engine, the method comprising the steps of:

considering the position of angle segments relative to a reference point (TDC) of the movement of the piston of the engine wherein said position is dependent upon at least one operating parameter of the engine and wherein the one parameters) is the engine load and/or the engine rpm;

determining a switchover between several segment lengths and segment positions in dependence of operating points;

evaluating segment times in which a shaft of the engine passes through said angle segments; and, detecting said misfires when said segment times exceed a predetermined threshold value.

4. The method of claim 2, wherein a switchover between several segment lengths and segment positions is determined in dependence of operating points.

* * * * *